(12) United States Patent
Schuetze et al.

(10) Patent No.: US 9,011,783 B2
(45) Date of Patent: Apr. 21, 2015

(54) DIESEL OXIDATION CATALYST

(75) Inventors: Frank-Walter Schuetze, Haibach (DE); Stéphanie Frantz, Loerrach (DE); Gerald Jeske, Neuberg (DE); Christoph Hengst, Butzbach (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 254 days.

(21) Appl. No.: 13/503,797

(22) PCT Filed: Nov. 12, 2009

(86) PCT No.: PCT/EP2009/008047
§ 371 (c)(1),
(2), (4) Date: Apr. 24, 2012

(87) PCT Pub. No.: WO2011/057649
PCT Pub. Date: May 19, 2011

(65) Prior Publication Data
US 2012/0213674 A1 Aug. 23, 2012

(51) Int. Cl.
*B01D 50/00* (2006.01)
*B01D 53/94* (2006.01)
(Continued)

(52) U.S. Cl.
CPC .......... *B01D 53/944* (2013.01); *B01D 53/9477* (2013.01); *B01D 2255/1021* (2013.01);
(Continued)

(58) Field of Classification Search
USPC .................. 422/177, 180; 502/325, 339, 344; 60/274, 297; 55/523
See application file for complete search history.

(56) References Cited

U.S. PATENT DOCUMENTS

| 5,928,981 | A | 7/1999 | Leyrer et al. |
| 6,514,905 | B1 | 2/2003 | Hanaki et al. |

(Continued)

FOREIGN PATENT DOCUMENTS

| EP | 0 800 856 B1 | 10/1997 |
| EP | 1 054 722 B1 | 11/2000 |

(Continued)

OTHER PUBLICATIONS

International Search Report for PCT/EP2009/008047 mailed Jul. 29, 2010 (in English).

(Continued)

*Primary Examiner* — Tom Duong
(74) *Attorney, Agent, or Firm* — Smith, Gambrell & Russell, LLP

(57) ABSTRACT

The invention relates to a catalyst for purifying the exhaust gases from diesel engines, in particular an oxidation catalyst which is particularly well suited for the purification of exhaust gases from heavy goods vehicles when further exhaust gas purification units such as a particle filter and/or a nitrogen oxide reduction catalyst are installed downstream thereof. The catalyst contains two catalytically active coatings which have different compositions and of which only one is in direct contact with the outflowing exhaust gas. The coating (1) which is in direct contact with the outflowing exhaust gas is platinum-rich and contains a total amount of noble metal (platinum and palladium) which is greater than that in the coating (2) which is not in direct contact with the outflowing exhaust gas. The platinum-rich coating (1) displays an extremely high oxidizing power, in particular in the NO oxidation, while the coating (2) which is not in direct contact with the outflowing exhaust gas ensures a good "heat-up performance" of the catalyst.

20 Claims, 5 Drawing Sheets

Figure 1:
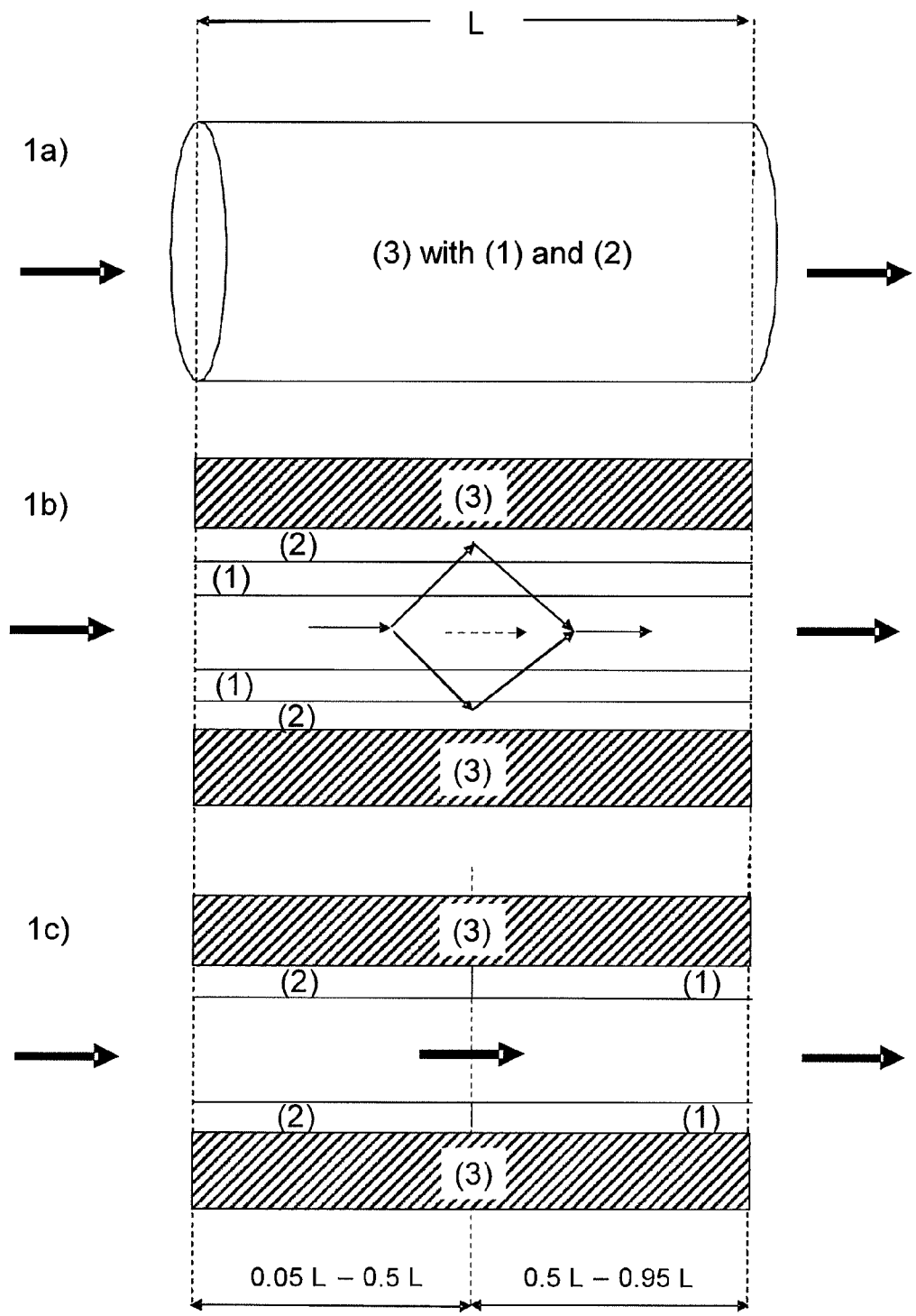

(51) Int. Cl.
  *B01J 23/44* (2006.01)
  *B01J 29/74* (2006.01)
  *B01J 35/00* (2006.01)
  *B01J 37/02* (2006.01)
  *B01J 21/12* (2006.01)
  *F01N 3/10* (2006.01)

(52) U.S. Cl.
  CPC . *B01D2255/1023* (2013.01); *B01D 2255/2092* (2013.01); *B01D 2255/9022* (2013.01); *B01D 2257/502* (2013.01); *B01D 2257/702* (2013.01); *B01D 2258/012* (2013.01); *B01J 21/12* (2013.01); *B01J 23/44* (2013.01); *B01J 29/7415* (2013.01); *B01J 35/0006* (2013.01); *B01J 37/0244* (2013.01); *B01J 37/0246* (2013.01); *F01N 3/10* (2013.01); *F01N 2510/06* (2013.01)

(56) References Cited

U.S. PATENT DOCUMENTS

| | | | |
|---|---|---|---|
| 6,805,849 | B1 | 10/2004 | Andreasson et al. |
| 6,928,806 | B2 | 8/2005 | Tennison et al. |
| 7,563,744 | B2 | 7/2009 | Klein et al. |
| 7,977,275 | B2 | 7/2011 | Pfeifer et al. |
| 2004/0087439 | A1 | 5/2004 | Hwang et al. |
| 2008/0045405 | A1 | 2/2008 | Beutel et al. |
| 2008/0187477 | A1* | 8/2008 | Nochi et al. ............... 423/239.1 |
| 2009/0169451 | A1 | 7/2009 | Andreasson et al. |
| 2009/0320449 | A1* | 12/2009 | Beutel et al. .................... 60/274 |
| 2010/0095658 | A1 | 4/2010 | Spurk et al. |
| 2011/0286903 | A1 | 11/2011 | Andreasson et al. |

FOREIGN PATENT DOCUMENTS

| | | |
|---|---|---|
| EP | 1 066 874 A1 | 1/2001 |
| EP | 1 370 357 B1 | 12/2003 |
| JP | 59-52530 | 3/1984 |
| JP | 2009-228575 A | 10/2009 |
| WO | 2006/021337 A1 | 3/2006 |
| WO | 2008/101675 A1 | 8/2008 |

OTHER PUBLICATIONS

International Preliminary Report on Patentability for PCT/EP2009/008047, with the Written Opinion of the International Searching Authority (English Translation), mailed May 24, 2012.

* cited by examiner

DIESEL OXIDATION CATALYST

The invention relates to a catalyst for purifying the exhaust gases from diesel engines, in particular an oxidation catalyst which is, inter alia, particularly well suited for the purification of exhaust gases from heavy duty vehicles when further exhaust gas purification units such as a particle filter and/or a nitrogen oxide reduction catalyst are installed downstream thereof.

The raw exhaust gas from diesel engines contains carbon monoxide CO, hydrocarbons HC and nitrogen oxides $NO_x$ together with a relatively high oxygen content of up to 15% by volume. In addition, it contains particle emissions which consist predominantly of soot and possibly organic agglomerates and originate from partially incomplete combustion of the fuel in the cylinder. The pollutant gases carbon monoxide and hydrocarbons can easily be rendered non-polluting by oxidation over a suitable oxidation catalyst. To remove the particle emissions, diesel particle filters with and without a catalytically active coating are suitable devices. The reduction of the nitrogen oxides to nitrogen ("NOx removal" from the exhaust gas) is difficult because of the high oxygen content. A known method is selective catalytic reduction (SCR) of the nitrogen oxides over a suitable catalyst, known as an SCR catalyst for short. This method is at present preferred for the removal of NOx from diesel engine exhaust gases. The nitrogen oxides present in the exhaust gas are decreased in the SCR process with the aid of a reducing agent introduced into the exhaust gas system from an external source. As reducing agent, preference is given to using ammonia or an ammonia-liberating compound such as urea or ammonium carbamate. The ammonia, optionally generated in situ from the precursor compound, reacts with the nitrogen oxides in the exhaust gas in a comproportionation reaction over the SCR catalyst to form nitrogen and water.

Adherence to the legal exhaust gas limit values for diesel vehicles which will be applicable in future in Europe, North America and Japan essentially requires a combination of various exhaust gas purification units. Such exhaust gas purification systems have already been proposed and are at present being tested or are being prepared for mass production for a number of vehicle types (passenger cars and heavy duty vehicles).

Thus, EP-B-1 054 722 describes a system for the treatment of $NO_x$— and particle-containing diesel exhaust gases, in which an oxidation catalyst is preceded by a particle filter. A reducing agent source and a metering device for the reducing agent and also an SCR catalyst are arranged downstream of the particle filter. U.S. Pat. No. 6,928,806 likewise describes a system for removing nitrogen oxides and particles from the exhaust gas of diesel engines. Here, an SCR catalyst with preceding reducing agent introduction is firstly installed downstream of an oxidation catalyst. A diesel particle filter is located downstream of the SCR catalyst.

The upstream oxidation catalyst in such combination systems has to meet particular requirements. The reactions taking place over the oxidation catalyst are intended to treat the exhaust gas so that a very optimal exhaust gas purification result can be achieved at the downstream units, too. It has to be taken into account, for example, that the SCR catalyst displays the best degrees of conversion of nitrogen oxides when an optimal $NO/NO_2$ ratio prevails at the entry into the SCR catalyst. This optimal $NO/NO_2$ ratio is about 1 for all SCR catalysts known at present. If the NO present in the exhaust gas consists of only NO and $NO_2$, the optimal $NO_2/NO_x$ ratio is in the range from 0.3 to 0.7, preferably in the range from 0.4 to 0.6 and particularly preferably 0.5. Whether this ratio is achieved in a system as described in U.S. Pat. No. 6,928,806 depends on the exhaust gas temperature and thus on the operating state of the engine and on the activity of the oxidation catalyst. In a system as described in EP-B-1 054 722, further influencing parameters are the configuration and soot loading of the diesel particle filter located downstream of the oxidation catalyst, since the oxidation of soot by means of $NO_2$ forms predominantly NO in addition to CO and $CO_2$.

A further important requirement which an oxidation catalyst in a combination system has to meet results from the requirement that a downstream diesel particle filter has to be regenerated occasionally. In most systems, particles deposit in the filter over the operating time and these cannot be burnt by means of oxygen or $NO_2$ in situ, i.e. during operation, to the same extent as they are introduced into the filter. This results in an increase in the exhaust gas counterpressure over the filter. When a predefined threshold value is reached, an active particle filter regeneration is triggered, i.e. the particle filter is heated to a higher temperature level in order to exceed the soot ignition temperature, which may have been catalytically decreased, and to burn the soot deposited in the filter by means of oxygen to form $CO_2$. There are various strategies for heating the particle filter at the commencement of the regeneration phase. Established strategies include the injection of fuel into the combustion chamber of the cylinder during the exhaust stroke of the piston or as secondary injection into the exhaust gas system. The injected fuel is catalytically burnt over the oxidation catalyst and the heat of reaction liberated is introduced into the exhaust gas and utilized for heating the downstream particle filter to a temperature above the soot ignition temperature.

In a combination system having a particle filter and an SCR catalyst, the upstream oxidation catalyst therefore has to meet not only the usual requirements such as a high thermal long-term stability, good poisoning resistance to sulphur-containing compounds (in particular $SO_x$) and very high CO and HC conversion at an ideally low ignition temperature (light-off temperature) but also two additional requirements:

1. The degree of oxidation of NO has to be matched very well to the downstream SCR catalyst, i.e. the $NO_2/NO_x$ ratio produced over the oxidation catalyst should ideally be around or above 0.5.
2. The oxidation catalyst has to be well suited as "heating catalyst" for a downstream particle filter, i.e. it has to be able to oxidize very large amounts of unburnt hydrocarbons over a short time without the oxidation reaction ceasing. The conversion of the unburnt hydrocarbons has to be as complete as possible since breakthrough of unburnt hydrocarbons through the oxidation catalyst to the SCR catalyst which is located further downstream can lead to poisoning of the latter. In addition, breakthrough of unburnt hydrocarbons at the end of the exhaust gas system can lead to the legal limit values not being adhered to. The combustion of fuel over the oxidation catalyst has to "ignite" at ideally low exhaust gas temperatures (from 180 to 250° C.).

Overall, the oxidation catalyst should also display very high HC conversions even at very low exhaust gas temperatures, and the HC conversion should increase ideally very quickly to maximum values after the light-off temperature is reached. In addition, the catalyst has to be sufficiently ageing-stable for its activity not to be excessively impaired by the heat of reaction liberated during the exothermic combustion of hydrocarbons. These performance requirements will hereinafter be referred to summarily as "heat-up performance".

Furthermore, for use of the catalyst in combination systems for purifying the exhaust gases of diesel vehicles, it has to be taken into account that, for example, heavy commercial vehicles such as town buses, waste disposal fleets, building machines or agricultural machinery are often used under fundamentally different operating conditions than diesel passenger cars. This results in a different exhaust gas profile with considerably lower exhaust gas temperatures and different exhaust gas compositions. Thus, compared to diesel passenger car exhaust gases, the nitrogen oxide content in the raw exhaust gas is significantly lower but the proportion of particle emissions may be appreciably increased. The performance of the upstream oxidation catalyst has to be matched to such an exhaust gas profile.

Conventional oxidation catalysts are not able to meet the above-described requirements, particularly for use in combination systems for purifying the exhaust gases from heavy commercial vehicles.

Thus, for example, EP-B-0 800 856 by the applicant describes a diesel oxidation catalyst consisting of one or more zeolites which are present in the $Na^+$ or $H^+$ form and additionally one or more metal oxides selected from among aluminium silicate (weight ratio of silicon dioxide/aluminium oxide=0.005 to 1), aluminium oxide and titanium oxide and at least one platinum group metal. The catalyst in which the platinum group metals are only deposited on the additional metal oxides is able to oxidize, in particular, the long-chain, difficult-to-oxidize paraffins in the exhaust gas at temperatures below 200° C. However, the reaction is too slow and not sufficiently complete at low temperatures, so that breakthrough of unburnt hydrocarbons occurs when the catalyst is used as heating catalyst for active regeneration of a downstream filter. This catalyst is also unsuitable for use in combination systems with an SCR catalyst because of its insufficient NO oxidation activity.

EP-B-1 370 357 by the applicant describes a catalyst composed of a catalytically active coating on an inert honeycomb body composed of ceramic or metal. The coating comprises at least one of the platinum group metals platinum, palladium, rhodium and iridium on a finely divided oxidic support material which is based on silicon dioxide and has a low porosity. The support material comprises aggregates of essentially spherical primary particles having an average particle diameter in the range from 7 to 60 nm. The catalyst displays an improved thermal ageing resistance and a reduced tendency to be poisoned by sulphur-containing exhaust gas constituents (in particular $SO_x$). However, this catalyst displays neither sufficient NO oxidation activity for use in combination systems with an SCR catalyst nor satisfactory heat-up performance.

As described above, most diesel oxidation catalysts contain only a homogeneously composed functional coating. Catalysts having two functional coatings of different compositions, as are known, for example, for three-way catalysts for purifying the exhaust gases from spark ignition engines, tend to be rare in the case of diesel oxidation catalysts. US 2008/0045405 describes such a diesel oxidation catalyst. In this, a bottom layer ("bottom washcoat layer") or a downstream zone ("downstream washcoat layer) containing a high-surface-area, essentially silicon dioxide-free support material comprising platinum and/or palladium is applied to a support substrate. This bottom layer or downstream zone does not contain any HC storage components (e.g. zeolite). A top layer ("top washcoat layer") or an upstream zone ("upstream washcoat layer") which likewise contains a high-surface-area support material and platinum and/or palladium and in addition an HC storage material is applied to the bottom layer or upstream of the downstream zone. The catalyst has a Pt:Pd weight ratio in the top layer (or in the upstream zone) which is greater than the Pt:Pd weight ratio in the bottom layer (or in the downstream zone). The top layer (upstream zone) of the catalyst is optimized in respect of tolerance to sulphur and paraffin oxidation, while the bottom layer (downstream zone) is optimized in respect of hydrothermal stability. However, this catalyst having a covering layer which is optimized in respect of tolerance to sulphur and is consequently acidic does not display sufficient NO oxidation activity.

It is an object of the present invention to provide an oxidation catalyst which is suitable for use in a combination system comprising a particle filter and SCR catalyst with reducing agent injection for purifying the exhaust gases of diesel engines, in particular for purifying the exhaust gases of heavy commercial vehicles and meets the above-described requirements better than the oxidation catalysts known in the prior art.

This object is achieved by a catalyst for purifying the exhaust gases of diesel engines, which comprises a support body and two catalytically active coatings which have different compositions and of which only one is in direct contact with the outflowing exhaust gas. Both coatings contain the platinum group metals platinum (Pt) and palladium (Pd) as catalytically active components, with the coating which is in direct contact with the outflowing exhaust gas containing more Pt than Pd. The catalyst is characterized in that the coating which is in direct contact with the outflowing exhaust gas contains a greater amount of total platinum group metals than the coating which is not in direct contact with the outflowing exhaust gas.

The coatings present in the catalyst of the invention perform different functions. Thus, the coating which is in direct contact with the outflowing exhaust gas has excellent oxidation activity towards the components HC and CO and especially towards NO. The combination of an increased total noble metal content of the layer with a high Pt:Pd weight ratio makes the oxidizing power of the coating which is in direct contact with the outflowing exhaust gas significantly greater than the oxidizing power of the coating which has a lower total noble metal content and is not in direct contact with the outflowing exhaust gas. As a result, the catalyst of the invention displays not only virtually complete CO and HC conversion but also excellent degrees of formation of $NO_2$ during the "normal operating phases" independent of active regeneration of a downstream particle filter. In respect of the exhaust gas purification components particle filter and SCR catalyst located downstream in a combination system, this has two advantages: as a result of the increased $NO_2$ content of the exhaust gas, the proportion of the particles deposited on the filter which can be oxidized and thus burnt off in situ, i.e. during normal operation, without additional heating measures is increased. The formation of a "filter cake" of soot particles in the filter and thus the increase in the exhaust gas counterpressure over the filter is consequently slowed. The filter has to be regenerated less often. Furthermore, the excellent degrees of formation of $NO_2$ over the catalysts of the invention during normal operation ensures that the $NO_2/NO_x$ ratio at the entry into the downstream SCR catalyst is in the range from 0.3 to 0.7. As a result, excellent degrees of conversion of $NO_x$ are possible over the SCR catalyst even at low temperatures (from 180 to 250° C.).

The coating which is in direct contact with the outflowing exhaust gas preferably contains from 1.2 to 2 times as much platinum group metal as the coating which is not in direct contact with the outflowing exhaust gas. In preferred embodiments of the catalyst of the invention, from 55 to 80% by weight of the total noble metal present in the catalyst is in the coating which is in direct contact with the outflowing exhaust gas, particularly preferably from 55 to 70% by weight and ideally from 57 to 60% by weight.

Furthermore, it preferably has a Pt:Pd weight ratio which is greater than or equal to 6:1. The Pt:Pd weight ratio is particularly preferably in the range from 6:1 to 20:1, very particularly preferably from 6:1 to 10:1 and ideally 7:1. The oxidizing power of the coating which is in direct contact with the outflowing exhaust gas is then very well matched to the required degrees of formation of $NO_2$ without excessively high total amounts of noble metal, in particular very large amounts of the expensive noble metal platinum, having to be employed.

The second coating which is not in direct contact with the outflowing exhaust gas contains a smaller total amount of noble metal and has a significantly lower Pt:Pd weight ratio, i.e. a significantly larger relative amount of palladium. This coating which is not in direct contact with the outflowing exhaust gas preferably has a Pt:Pd weight ratio of from 1:4 to 2:1, particularly preferably from 1:2 to 1:1. It assumes the function of "heating-up" during active regeneration of a downstream particle filter and displays a very good heat-up performance (as described above).

To aid HC conversion in general and the heat-up performance in particular, particularly preferred embodiments of the catalyst of the invention therefore contain one or more zeolite compounds selected from the group consisting of beta-zeolites, X-zeolites, Y-zeolites, mordenites and ZSM-5 zeolites in the coating which is not in direct contact with the outflowing exhaust gas. These zeolites display a storage action in respect of the hydrocarbons occurring in the diesel exhaust gas. The presence of the HC-storing zeolites in the coating which is not in direct contact with the outflowing exhaust gas has the advantage that hydrocarbons which, for example, have been incorporated in the zeolites during the cold start phase or, owing to the amount thereof, during a "heat-up" phase for active filter regeneration and are liberated again from the HC store at a later point in time under suitable operating conditions have to pass, due to forced flow, the noble metal-rich coating which is in direct contact with the outflowing exhaust gas. This ensures that these hydrocarbons are converted as completely as possible into $CO_2$ and water since the coating which is in contact with the outflowing exhaust gas is, as mentioned above, the coating having the greater oxidizing power. As a result, better HC conversion performances over the total driving cycle are achieved over appropriate embodiments of the catalyst of the invention than over catalysts according to the prior art in which no HC-storing zeolite compounds are present and in which these are arranged in a coating which is in contact with the outflowing exhaust gas.

According to the findings of the inventors, the combination of the two layers makes it possible for the first time to provide an oxidation catalyst which can meet all requirements which the oxidation catalyst has to meet in a combination system at an economically viable total noble metal content. The two technical effects of NO oxidation and heat-up performance which occur in different operating states of the catalyst can, according to the findings of the inventors, become fully effective only when the three-dimensional arrangement of the coatings is adhered to, i.e. when it is the more noble metal-rich and platinum-rich coating having the greater oxidizing power which is in direct contact with the outflowing exhaust gas.

In preferred embodiments of the catalyst of the invention, platinum and/or palladium in the two layers are applied to one or more high-melting, high-surface-area support oxides selected from the group consisting of aluminium oxides, zirconium oxide- and/or titanium oxide-doped aluminium oxides or aluminium-silicon mixed oxides. To produce a suitable coating suspension, the support oxides selected are suspended in water. Platinum and palladium are added in the form of suitable water-soluble precursor compounds such as palladium nitrate or hexahydroxyplatinic acid to the suspension while stirring and optionally fixed on the support material by setting of the pH and/or by addition of an auxiliary reagent. Appropriate precursor compounds and auxiliary reagents are known to those skilled in the art. The suspensions obtained in this way are then milled and applied to an inert support body by one of the conventional coating processes. After each coating step, the coated part is dried in a stream of hot air and a calcination is optionally carried out. As support bodies for the catalytically active coatings, preference is given to using ceramic or metallic flow-through honeycomb bodies for producing the catalyst of the invention.

There are various possible arrangements of the coatings on the support body. FIG. 1 shows the preferred embodiments.

The catalytically active coating (2) which is not in direct contact with the outflowing exhaust gas is preferably, as shown in FIG. 1 b) applied directly to the flow-through honeycomb body and extends over the entire length of the component and is covered on the exhaust gas side over the entire length of the component by the coating (1) which is in direct contact with the outflowing exhaust gas. This forms a 2-layer catalyst or "layer catalyst" in which the "heat-up" functional coating which is richer in palladium and optionally contains zeolite is present as bottom layer and is completely covered by the coating which is richer in platinum and has the higher oxidizing power as top layer.

Furthermore, the catalytically active coating (2) which is not in direct contact with the outflowing exhaust gas in the catalyst of the invention can be applied to the flow-through honeycomb body in such a way that on the inflow side it extends over only from 5 to 50% of the length of the component and thus forms an upstream zone. The coating (1) which is in direct contact with the outflowing exhaust gas then extends over the remaining length of the component and thus forms an adjoining downstream zone. FIG. 1 c) shows such an embodiment as "zone catalyst". An advantage of a zone catalyst is that the zone lengths can easily be matched to the performance profile required by the combination system in which the catalyst is to be used. If the catalyst of the invention is followed firstly by a particle filter and then an SCR catalyst, so that relatively high $NO_2/NO_x$ ratios (from 0.6 to 0.9) have to be provided as a result of the burning-off of soot by means of $NO_2$ during normal operation, the downstream zone can cover from 70 to 95% of the length L of the flow-through honeycomb body. If, for example due to a particular operating profile of a commercial vehicle in which very large amounts of particles are produced at relatively cold exhaust gas temperatures, frequent active regenerations of a downstream particle filter are necessary, the length of the upstream "heat-up" coating zone can readily be from 40 to 50% of the length of the flow-through honeycomb body.

Regardless of whether the catalyst of the invention is configured as a "layer catalyst" or as a "zone catalyst", it is particularly advantageous for the (bottom) layer applied directly on the flow-through honeycomb body or the upstream zone also to contain one or more zeolite compounds which are selected from the group consisting of beta-zeolites, X-zeolites, Y-zeolites, mordenites and ZSM-5 zeolites and display a storing action in respect of the hydrocarbons occurring in the diesel exhaust gas. It has been mentioned above that this zeolite addition brings about an improvement in the HC conversion in general and the "heat-up performance" in particular.

The catalyst of the invention is suitable for use in apparatuses for purifying the exhaust gases of diesel engines. Such an apparatus particularly preferably additionally contains a diesel particle filter and/or a catalyst for the selective catalytic reduction of nitrogen oxides, with the catalyst of the invention being installed upstream of the diesel particle filter and/or the catalyst for the selective catalytic reduction of nitrogen oxides.

The invention is illustrated below with the aid of some figures and examples. The figures show:

FIG. 1: Various embodiments of the catalysts of the invention; the arrows indicate the flow direction of the exhaust gas to be purified.

1a) overview drawing: flow-through honeycomb body (3) having a length L and containing catalytically active coatings (1) and (2);

1b) configuration as "layer catalyst", shown as section of the flow-through honeycomb body (3) which shows precisely one flow channel; the catalytically active coating (2) which is not in direct contact with the outflowing exhaust gas is applied directly to the flow-through honeycomb body (3) and is covered over the entire length of the flow-through honeycomb body (3) by the coating (1) which is in direct contact with the outflowing exhaust gas;

1c) configuration as "zone catalyst", shown as section of the flow-through honeycomb body (3) which shows precisely one flow channel; the catalytically active coating (2) which is not in direct contact with the outflowing exhaust gas is configured as an upstream zone and covers from 5 to 50% of the length of the flow-through honeycomb body; the coating (1) which is in direct contact with the outflowing exhaust gas forms a downstream zone and covers the remaining length of the honeycomb body.

Figure 2:
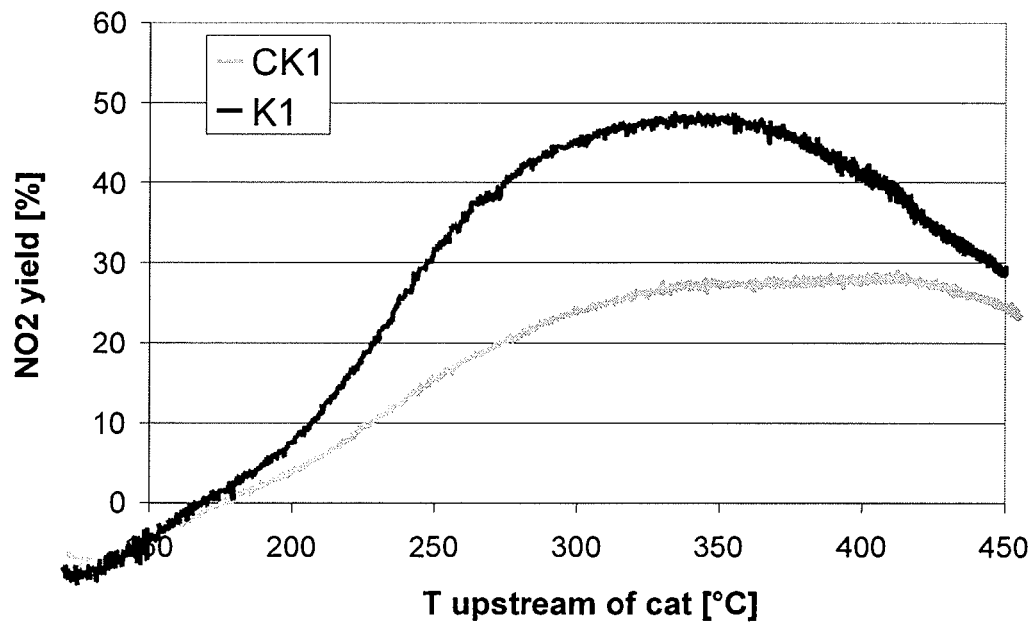

FIG. 2: $NO_2$ yield of the catalyst K1 according to the invention as a function of the temperature upstream of the catalyst compared to a single-layer catalyst CK1 according to the prior art.

Figure 3:
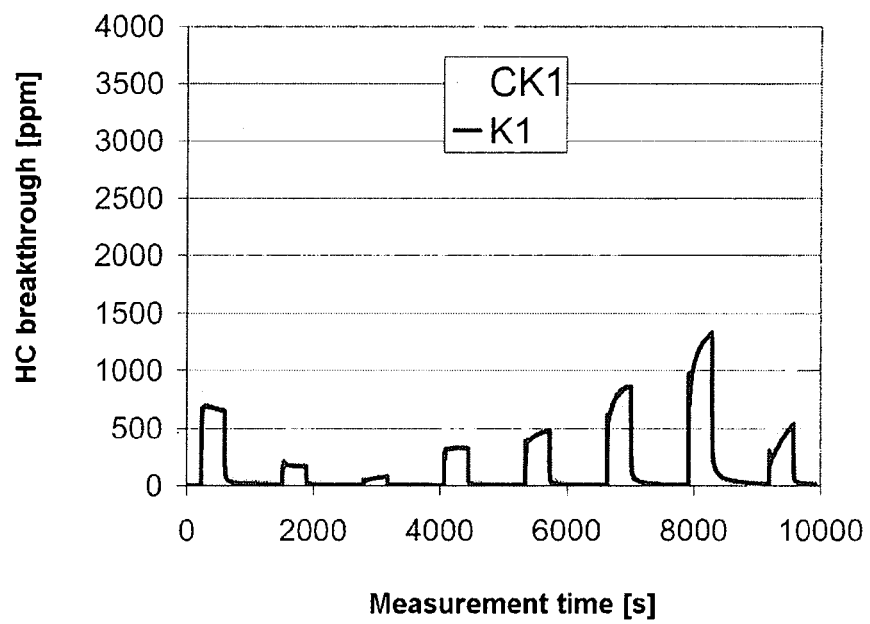

FIG. 3: HC breakthrough ("HC-slip") through a catalyst K1 according to the invention compared to a catalyst CK1 according to the prior art at operating points having a significantly increased HC throughput through the catalyst.

Figure 4:
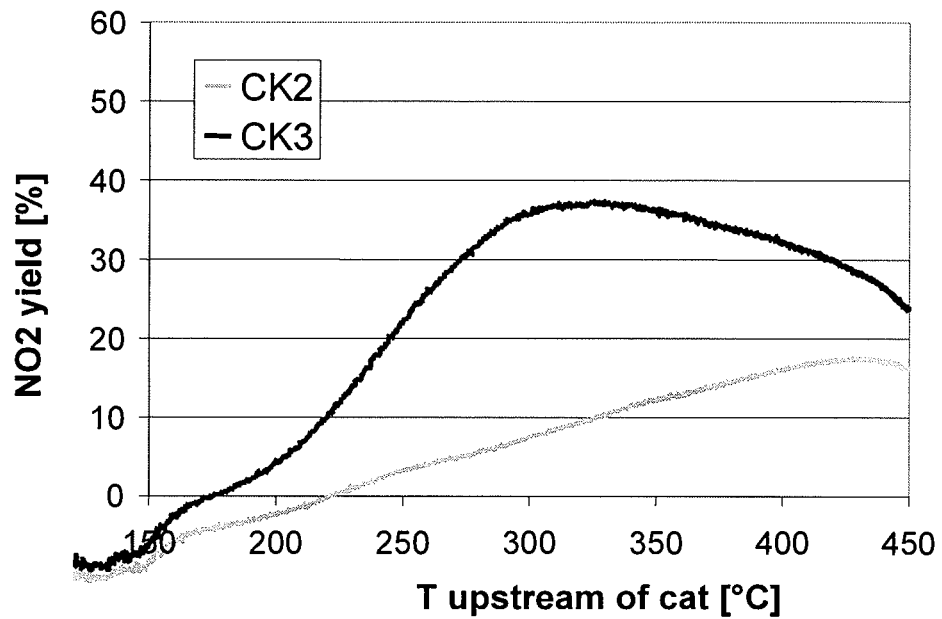

FIG. 4: $NO_2$ yield over the coating CK3 which is in direct contact with the outflowing exhaust gas compared to the $NO_2$ yield over the coating CK2 of the catalyst K1 according to the invention which is not in direct contact with the outflowing exhaust gas as a function of the temperature upstream of the catalyst.

Figure 5:
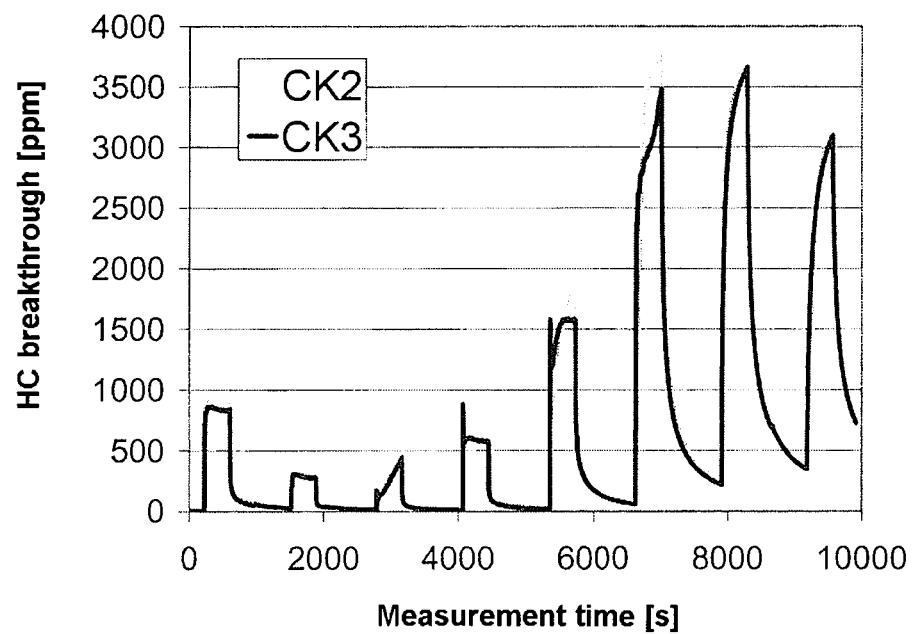

FIG. 5: HC breakthrough ("HC-slip") through the coating CK3 which is in direct contact with the outflowing exhaust gas compared to HC breakthrough through the coating CK2 of the catalyst K1 according to the invention which is not in direct contact with the outflowing exhaust gas at operating points having a significantly increased HC throughput through the catalyst.

Figure 6:
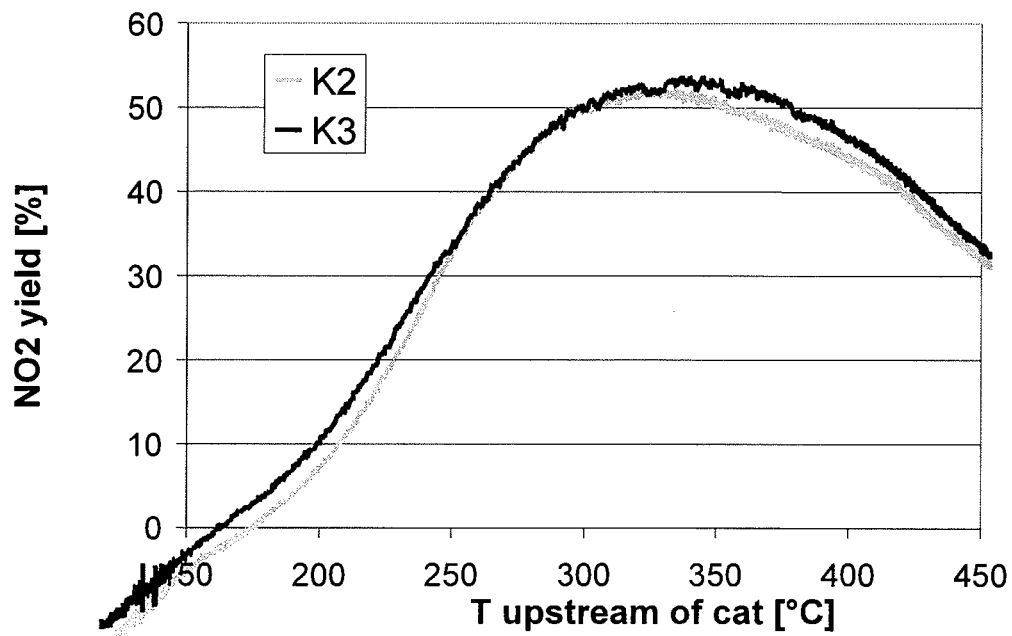

FIG. 6 $NO_2$ yield of the catalyst K2 according to the invention which does not contain any zeolite compound in the coating which is not in direct contact with the outflowing exhaust gas compared to the $NO_2$ yield of the catalyst K3 according to the invention having an addition of zeolite in the coating which is not in direct contact with the outflowing exhaust gas as a function of the temperature upstream of the catalyst.

Figure 7:
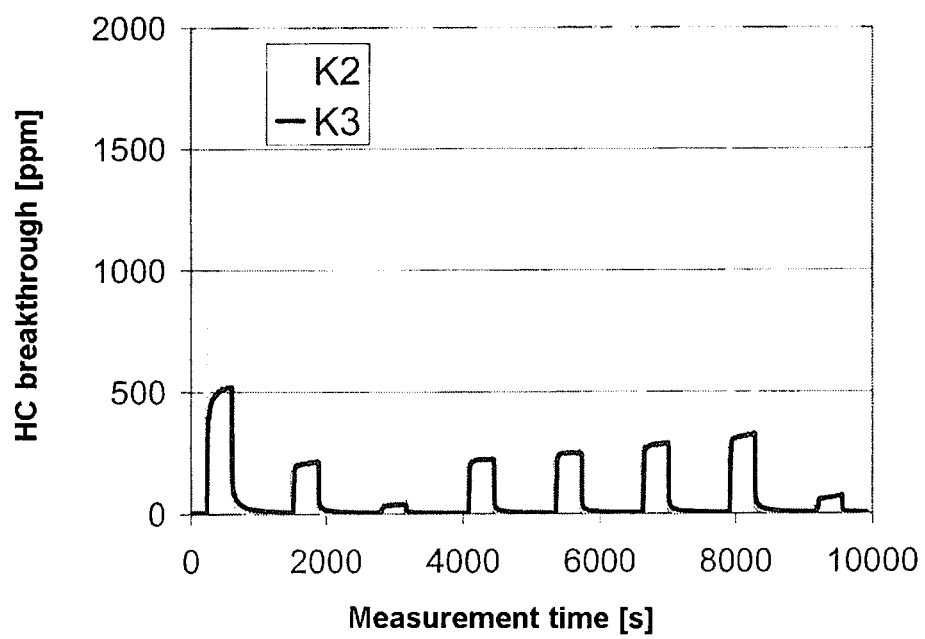

FIG. 7 HC breakthrough ("HC-slip") through the catalyst K2 according to the invention which does not contain any zeolite compound in the coating which is not in direct contact with the outflowing exhaust gas compared to the HC breakthrough through the catalyst K3 according to the invention with zeolite addition in the coating which is not in direct contact with the outflowing exhaust gas.

Figure 8:
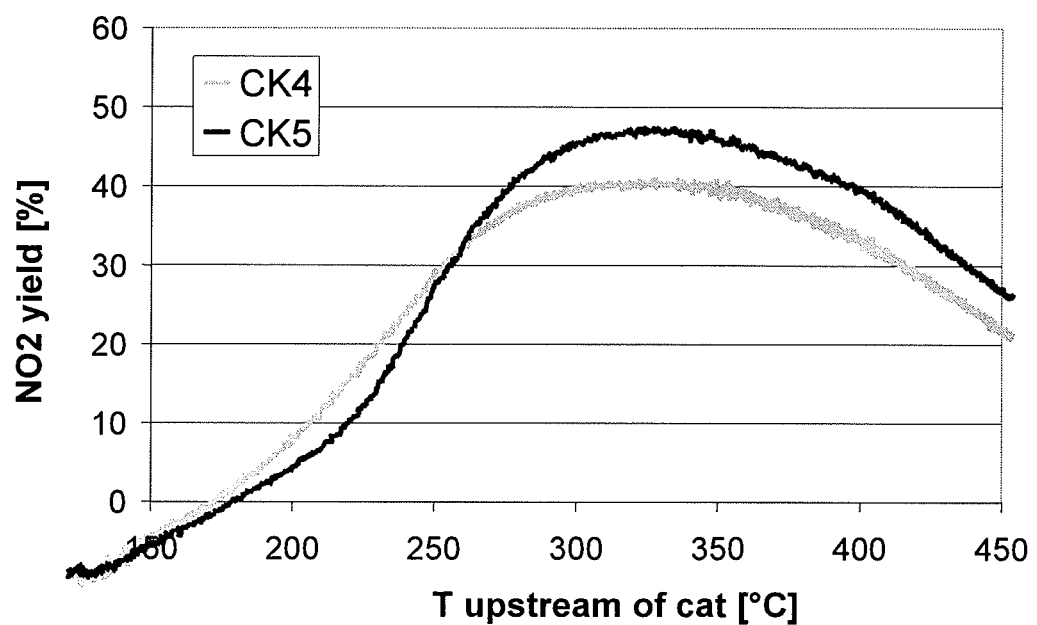

FIG. 8: $NO_2$ yield of a comparative catalyst CK5 with three-dimensional arrangement according to the invention of the functional layers and zeolite compound in the coating which is not in direct contact with the outflowing exhaust gas compared to the $NO_2$ yield of the comparative catalyst CK4 which has an identical composition but the reverse three-dimensional arrangement of the layers, as a function of the temperature upstream of the catalyst.

Catalysts according to the invention and some comparative catalysts were produced. For this purpose, ceramic honeycomb bodies which had a diameter of 266.7 mm and a length of 152.4 mm and had 62 cells per cm$^2$ with a cell wall thickness of 0.1651 mm were coated with coating suspensions having the composition given below by means of a conventional dipping process. After application of the coating suspension, the honeycomb bodies were dried in a hot air blower and thermally treated at 500° C.

The catalytic activity of the finished catalysts was examined on an engine test bench equipped with a MAN D2066 Common-Rail diesel engine having a solid capacity of 10.5 l (Euro-IV). The test bench had temperature measurement points upstream of the catalyst and also facilities for detailed exhaust gas analysis upstream and downstream of the catalyst.

Before testing, the catalysts were firstly subjected to artificial ageing. For this purpose, they were stored at a temperature of 750° C. in a hydrothermal atmosphere (10% by volume of $H_2O$ and 10% by volume of $O_2$ in air) in a furnace for 16 hours.

To examine the NO oxidation performance of the catalysts, a "light-off test" was carried out. Here, the catalyst is heated in the exhaust gas to be purified under defined conditions:

speed of rotation: 1100 min$^{-1}$
torque profile: 0→2130 Nm in t=1800 s
2130 Nm for t=30 s
2130→0 Nm in t=1800 s
→temperature upstream of the catalyst: 115-455° C.

During this, the NO and $NO_2$ concentrations in the exhaust gas upstream and downstream of the catalyst were measured by means of chemo-luminescence detectors (CLD; AVL) at a frequency of 1 Hz. From these data, it was then possible to determine the $NO_2$ yield according to $$Y_{NO_2} = \frac{c^{downstr.\ of\ cat}(NO_2) - c^{upstr.\ of\ cat}(NO_2)}{c^{upstr.\ of\ cat}(NO_x)}$$

as a function of the temperature, where $c^{upstr.\ of\ cat}(NO_x) = c^{upstr.\ of\ cat}(NO) + c^{upstr.\ of\ cat}(NO_2)$.

To examine the "heat-up performance", the following operating points were set in succession:

| Operating point | Revolutions [min$^{-1}$] | Torque [Nm] | Space velocity [h$^{-1}$] | Amount of HC introduced*) [g/min] | T upstr. of cat [° C.] |
|---|---|---|---|---|---|
| 1 | 2050 | 730 | 115 000 | 195 | 340 |
| 2 | 1600 | 700 | 70 000 | 110 | 340 |
| 3 | 1250 | 500 | 40 000 | 70 | 295 |

-continued

| Operating point | Revolutions [min$^{-1}$] | Torque [Nm] | Space velocity [h$^{-1}$] | Amount of HC introduced*$^)$ [g/min] | T upstr. of cat [° C.] |
|---|---|---|---|---|---|
| 4 | 1835 | 435 | 70 000 | 120 | 300 |
| 5 | 1900 | 400 | 70 000 | 125 | 290 |
| 6 | 1950 | 310 | 70 000 | 135 | 270 |
| 7 | 1980 | 255 | 70 000 | 140 | 255 |
| 8 | 1360 | 360 | 40 000 | 80 | 250 |

*$^)$HCR introduction by means of compressed air-controlled valve and mass flow meter to determine the amount metered in; introduction time: 6 min The proportion of residual hydrocarbons breaking through the oxidation catalyst was determined in ppm by volume by means of flame ionization detectors (FID, AVL) at a measurement frequency of 1 Hz.

COMPARATIVE EXAMPLE 1

A conventional diesel oxidation catalyst having only one active layer was produced. To produce a suitable coating suspension, a silicon-aluminium mixed oxide containing up to 20% by weight of $SiO_2$ was impregnated so as to fill the pores with platinum nitrate solution and palladium nitrate solution and dried. After thermal fixing of the noble metal, powder obtained in this way was suspended in water and applied after milling to a ceramic honeycomb body as described above. The finished catalyst CK1 after drying and calcination contained, based on the volume of the honeycomb body:

| | |
|---|---|
| 100 g/l | of silicon-aluminium mixed oxide containing up to 20% by weight of $SiO_2$ |
| 0.681 g/l | of platinum ex nitrate solution |
| 0.272 g/l | of palladium ex nitrate solution |

EXAMPLE 1

A catalyst according to the invention whose total noble metal content and platinum-palladium ratio correspond to those of the conventional diesel oxidation catalyst as per Comparative Example 1 was produced.

For this purpose, the ceramic honeycomb body was firstly provided with a first coating which, based on the volume of the finished catalyst, had the following composition:

| | |
|---|---|
| 40 g/l | of silicon-aluminium mixed oxide containing up to 20% by weight of $SiO_2$ |
| 0.204 g/l | of platinum ex nitrate solution |
| 0.204 g/l | of palladium ex nitrate solution |
| 15 g/l | of commercially available beta-zeolite |

This coating represented, after production of the finished catalyst, the coating which is not in direct contact with the outflowing exhaust gas.

After drying and calcination of the first layer, a second layer which, based on the volume of the finished catalyst, had the following composition:

| | |
|---|---|
| 40 g/l | of silicon-aluminium mixed oxide containing up to 20% by weight of $SiO_2$ |
| 0.477 g/l | of platinum ex nitrate solution |
| 0.068 g/l | of palladium ex nitrate solution | was applied thereto.

This coating represents, after production of the finished catalyst, the coating which is in direct contact with the outflowing exhaust gas.

The compositions are based on the finished catalyst K1 after drying and calcination.

FIG. 2 shows the $NO_2$ yield of the catalyst K1 according to the invention as a function of the temperature upstream of the catalyst compared to the single-layer catalyst CK1 according to the prior art. The $NO_2$ yield obtained using the catalyst according to the invention is up to 20% higher in a comparable temperature range.

FIG. 3 shows the HC breakthrough observed downstream of the catalyst at the abovementioned operating point of the "heat-up tests" for the catalyst K1 according to the invention and the catalyst CK1 according to the prior art. The catalyst according to the invention displays significantly lower HC breakthroughs than the catalyst CK1 according to the prior art at six of eight operating points tested.

With the aid of the two comparative catalysts CK2 and CK3, the functionalities of the two coatings present in the catalyst according to the invention were examined independently of one another.

Comparative Catalyst 2:

A ceramic honeycomb body was provided with a coating which, based on the volume of the finished catalyst CK2, had the following composition:

| | |
|---|---|
| 40 g/l | of silicon-aluminium mixed oxide containing up to 20% by weight of $SiO_2$ |
| 0.204 g/l | of platinum ex nitrate solution |
| 0.204 g/l | of palladium ex nitrate solution |
| 15 g/l | of commercially available beta-zeolite |

This coating corresponded to the bottom coating of the catalyst K1 from Example 1 which is not in direct contact with the outflowing exhaust gas.

Comparative Catalyst 3:

A ceramic honeycomb body was provided with a coating which, based on the volume of the finished catalyst CK3, had the following composition:

| | |
|---|---|
| 40 g/l | of silicon-aluminium mixed oxide containing up to 20% by weight of $SiO_2$ |
| 0.477 g/l | of platinum ex nitrate solution |
| 0.068 g/l | of palladium ex nitrate solution |

This coating corresponded to the top coating of the catalyst K1 from Example 1 which is in direct contact with the outflowing exhaust gas.

FIG. 4 shows the $NO_2$ yield over the catalysts CK2 and CK3. It is obvious that CK3, which corresponds to the coating which is in direct contact with the outflowing exhaust gas in the catalyst K1 according to the invention, gives a significantly higher $NO_2$ yield than CK2 which corresponds to the coating which is not in direct contact with the outflowing exhaust gas.

FIG. 5 shows the HC breakthrough through CK2 and CK3, which is comparable for both layers. The comparison with the HC breakthrough of the catalyst K1 according to the invention in FIG. 2 is more interesting: if the two coatings which, as shown by FIG. 3, each themselves display no particularly good "heat-up performance" are combined to form the catalyst according to the invention, the HC breakthrough over the resulting catalyst is decreased dramatically in the case of the three-dimensional arrangement of the two layers according to the invention. At the operating points 6, 7 and 8, at which very high HC throughputs occur, the HC breakthrough is reduced from 3000-3500 ppm by volume, which is characteristic of the individual layers, to less than 1000 ppm by volume at the operating points 6 and 8 and to less than 1500 ppm by volume at the operating point 7. This effect is not to be expected in the light of the individual performances of the respective functional coatings as such. The reason is a synergistic interaction between the palladium-rich coating which is not in direct contact with the outflowing exhaust gas and the second coating which is in direct contact with the outflowing exhaust gas. The outflowing exhaust gas is forced through the coating having the higher oxidizing power. As a result, the residual hydrocarbons which cannot be converted by the "heat-up coating" alone or have been prematurely desorbed, are oxidized. This leads to a very significant reduction in the HC breakthrough through the catalyst according to the invention and thus to an excellent "heat-up performance".

The two catalysts K2 and K3 according to the invention clearly show the influence of the additional zeolite in the coating which is not in direct contact with the outflowing exhaust gas.

EXAMPLE 2

Using a procedure analogous to that described in Example 1, a catalyst K2 according to the invention having two superposed layers having the following composition:

1st layer=bottom layer=coating not in direct contact with the outflowing exhaust gas:

| 92 g/l | of silicon-aluminium mixed oxide containing up to 20% by weight of $SiO_2$ |
| --- | --- |
| 0.302 g/l | of platinum ex nitrate solution |
| 0.302 g/l | of palladium ex nitrate solution |

2nd layer=top layer=coating in direct contact with the outflowing exhaust gas:

| 45 g/l | of silicon-aluminium mixed oxide containing up to 20% by weight of $SiO_2$ |
| --- | --- |
| 0.706 g/l | of platinum ex nitrate solution |
| 0.101 g/l | of palladium ex nitrate solution | was produced.

EXAMPLE 3

Using a procedure analogous to that described in Example 1, a catalyst K2 according to the invention having two superposed layers having the following composition:

1st layer=bottom layer=coating which is not in direct contact with the outflowing exhaust gas:

| 40 g/l | of silicon-aluminium mixed oxide containing up to 20% by weight of $SiO_2$ |
| --- | --- |
| 0.303 g/l | of platinum ex nitrate solution |
| 0.303 g/l | of palladium ex nitrate solution |
| 15 g/l | of commercially available beta-zeolite |

2nd layer=top layer=coating which is in direct contact with the outflowing exhaust gas:

| 45 g/l | of silicon-aluminium mixed oxide containing up to 20% by weight of $SiO_2$ |
| --- | --- |
| 0.706 g/l | of platinum ex nitrate solution |
| 0.101 g/l | of palladium ex nitrate solution | was produced.

FIG. 6 shows that the addition of zeolite in the coating which is not in direct contact with the outflowing exhaust gas has no significant influence on the $NO_2$ yield of the catalyst.

However, FIG. 7 shows that such an addition of zeolite significantly reduces the HC breakthrough through the catalyst and thus has a very positive effect on the "heat-up performance" of the catalyst.

Furthermore, what fundamental influence the three-dimensional arrangement of the functional layers has on the performance of the catalyst was examined. For this purpose, two further comparative catalysts were produced:

COMPARATIVE EXAMPLE 4

Using a procedure analogous to that described in Example 1, a double-layer comparative catalyst CK4 having the following composition, based on the volume of the finished catalyst:

1st layer=bottom layer=coating which is not in direct contact with the outflowing exhaust gas:

| 40 g/l | of silicon-aluminium mixed oxide containing up to 20% by weight of $SiO_2$ |
| --- | --- |
| 0.681 g/l | of platinum ex nitrate solution |
| 0.068 g/l | of palladium ex nitrate solution |

2nd layer=top layer=coating which is in direct contact with the outflowing exhaust gas:

| 40 g/l | of silicon-aluminium mixed oxide containing up to 20% by weight of $SiO_2$ |
| --- | --- |
| 0.204 g/l | of palladium ex nitrate solution |
| 15 g/l | of commercially available beta-zeolite | was produced.

COMPARATIVE EXAMPLE 5

Using a procedure analogous to that described in Example 1, a double-layer comparative catalyst CK5 having the following composition, based on the volume of the finished catalyst:

1st layer=bottom layer=coating which is not in direct contact with the outflowing exhaust gas:

| 40 g/l | of silicon-aluminium mixed oxide containing up to 20% by weight of $SiO_2$ |
| --- | --- |
| 0.204 g/l | of palladium ex nitrate solution |
| 15 g/l | of commercially available beta-zeolite |

2nd layer=top layer=coating which is in direct contact with the outflowing exhaust gas:

| | |
|---|---|
| 40 g/l | of silicon-aluminium mixed oxide containing up to 20% by weight of $SiO_2$ |
| 0.681 g/l | of platinum ex nitrate solution |
| 0.068 g/l | of palladium ex nitrate solution | was produced.

FIG. 8 shows the $NO_2$ yield over the catalysts CK4 and CK5. It can clearly be seen that the arrangement of the zeolite-free coating which has a higher oxidizing power as coating which is not in contact with the outflowing exhaust gas has a significant adverse effect on the NO oxidation power of the catalyst.

The invention claimed is:

1. A catalyst for purifying an outflowing exhaust gas of a diesel engine, comprising
a support body and two catalytically active coatings which have different compositions, with only a first coating of the two catalytically active coatings in direct contact with the outflowing exhaust gas, and with both coatings containing the platinum group metals platinum (Pt) and palladium (Pd) as catalytically active components, with the first coating containing more Pt than Pd, wherein
the first coating contains a greater amount of total platinum group metal than a second coating of the two catalytically active coatings that is not in direct contact with the outflowing exhaust gas, and
the second coating contains one or more zeolite compounds selected from beta-zeolites, X-zeolites, Y-zeolites, mordenites and ZSM-5 zeolites.

2. The catalyst according to claim 1, wherein the first coating contains from 1.2 to 2 times as much platinum group metal as the second coating.

3. The catalyst according to claim 2, wherein the first coating has a Pt:Pd weight ratio greater than or equal to 6:1.

4. The catalyst according to claim 2, wherein the second coating has a Pt:Pd weight ratio of from 1:4 to 2:1.

5. The catalyst according to claim 3, wherein the second coating has a Pt:Pd weight ratio of from 1:4 to 2:1.

6. The catalyst according to claim 1, wherein platinum and/or palladium are applied in both catalytically active coatings on one or more high-melting, high-surface-area support oxides selected from aluminium oxides, zirconium oxide- and/or titanium oxide-doped aluminium oxides, and aluminium-silicon mixed oxides.

7. The catalyst according to claim 1, wherein both catalytically active coatings are applied to a ceramic or metallic flow-through honeycomb body as the support body.

8. The catalyst according to claim 7, wherein the second coating is applied directly to the flow-through honeycomb body and extends over the entire length of the honeycomb body and is covered on the exhaust gas side by the first coating over the entire length of the component honeycomb body.

9. The catalyst according to claim 7, wherein the second coating is applied to the flow-through honeycomb body and extends on the upstream side over only from 5 to 50% of the length of the honeycomb body as an upstream zone while the first coating extends over the remaining length of the honeycomb body as an adjoining downstream zone.

10. An apparatus for purifying an exhaust gas of a diesel engine, comprising a catalyst according to claim 1.

11. The apparatus according to claim 10, wherein the catalyst is located upstream of a diesel particle filter and/or a catalyst for the selective catalytic reduction of nitrogen oxides.

12. A catalyst for purifying an outflowing exhaust gas of a diesel engine, comprising
a support body, a catalytically active bottom coating over the support body, and a catalytically active top coating over the bottom coating, wherein
the top and bottom catalytically active coatings have different compositions, with both coatings containing the platinum group metals platinum (Pt) and palladium (Pd) as catalytically active components, the top coating containing more Pt than Pd,
the top coating contains a greater amount of total platinum group metal than the bottom coating, and
the bottom coating contains one or more zeolite compounds selected from beta-zeolites, X-zeolites, Y-zeolites, mordenites and ZSM-5 zeolites.

13. The catalyst according to claim 12, wherein the top coating contains from 1.2 to 2 times as much platinum group metal as the bottom coating.

14. The catalyst according to claim 13, wherein the top coating has a Pt:Pd weight ratio greater than or equal to 6:1.

15. The catalyst according to claim 13, wherein the bottom coating has a Pt:Pd weight ratio of from 1:4 to 2:1.

16. The catalyst according to claim 14, wherein the bottom coating has a Pt:Pd weight ratio of from 1:4 to 2:1.

17. The catalyst according to claim 12, wherein
both catalytically active coatings are applied to a ceramic or metallic flow-through honeycomb body as the support body, and
platinum and/or palladium are applied in both catalytically active coatings on one or more high-melting, high-surface-area support oxides selected from aluminium oxides, zirconium oxide- and/or titanium oxide-doped aluminium oxides, and aluminium-silicon mixed oxides.

18. The catalyst according to claim 17, wherein the bottom coating is applied directly to the flow-through honeycomb body and extends over the entire length of the honeycomb body and is covered on the exhaust gas side by the top coating over the entire length of the honeycomb body.

19. The catalyst according to claim 17, wherein the bottom coating is applied to the flow-through honeycomb body and extends on the upstream side over only from 5 to 50% of the length of the honeycomb body as an upstream zone while the top coating extends over the remaining length of the honeycomb body as an adjoining downstream zone.

20. An apparatus for purifying an exhaust gas of a diesel engine, comprising a catalyst according to claim 12, wherein the catalyst is located upstream of a diesel particle filter and/or a catalyst for the selective catalytic reduction of nitrogen oxides.

* * * * *